United States Patent [19]

Holland et al.

[11] Patent Number: 5,139,704
[45] Date of Patent: Aug. 18, 1992

[54] FLUXLESS SOLDER

[75] Inventors: Wilson A. Holland, Playa del Rey; William E. Elias, El Segundo; Francis O. Duane, Palos Verdes Estate, all of Calif.

[73] Assignee: Hughes Aircraft Company, Los Angeles, Calif.

[21] Appl. No.: 654,866

[22] Filed: Feb. 12, 1991

[51] Int. Cl.$^5$ ............................................. H01B 1/06
[52] U.S. Cl. ................................... 252/521; 252/512
[58] Field of Search ...................... 252/512, 518, 521; 148/24

[56] References Cited

U.S. PATENT DOCUMENTS

| | | | |
|---|---|---|---|
| 4,646,958 | 3/1987 | Howard, Jr. | 228/123 |
| 4,655,385 | 4/1987 | Suzuki et al. | 228/223 |
| 4,673,532 | 6/1987 | Barajas et al. | 252/512 |
| 4,728,023 | 3/1988 | Barajas et al. | 228/180.1 |
| 4,937,006 | 6/1990 | Bickford et al. | 228/219 |
| 5,076,487 | 12/1991 | Bandyopadhyay | 228/219 |

FOREIGN PATENT DOCUMENTS 57-67142  4/1982  Japan .
63-50119 10/1988  Japan .

Primary Examiner—Mark L. Bell
Assistant Examiner—Chris Gallo
Attorney, Agent, or Firm—M. E. Lachman; W. J. Streeter; W. K. Denson-Low

[57] ABSTRACT

A fluxless solder for application to metal surfaces which include contaminants such as metal oxides. The fluxless solder includes a reducing agent which reacts with interfering metal oxides to form essentially inert compounds which require no further cleaning. Reducing agents, such as lithium, calcium, strontium and cesium are disclosed for use in lead-tin solders, in amounts ranging from about 0.5 to 10 atom percent. Various methods for forming the fluxless solder are also disclosed.

8 Claims, No Drawings

FLUXLESS SOLDER

BACKGROUND OF THE INVENTION

1. Field of the Invention

The present invention relates generally to soldering of metal surfaces without using a flux or other separate surface treatment. More particularly, the present invention relates to a solder which includes a reducing agent which preferentially reacts with and removes interfering oxides during the soldering process to enhance surface wetting and solderability.

2. Description of Related Art

In order to produce high quality solder joints, it is essential that the surfaces to be joined be free of contaminants. Many contaminants such as organic solvents and cleaning fluids can be removed by relatively simple cleaning processes. Other contaminants such as metal oxides are more difficult to remove. The presence of metal oxides on the surface to be soldered or in the solder itself prevents adequate wetting of the surface with solder and results in a poor bond. Such oxides are referred to herein as "interfering oxides". A variety of different flux materials has typically been used to remove oxides and other contaminants from the surface to be soldered. Fluxes may be incorporated directly into the solder or they may be applied separately to the surface prior to soldering.

A major problem with fluxes is they leave a residue which many times is difficult to remove from the surfaces of the soldered components. In addition, the removal of such residues often requires the use of chlorofluorocarbons which have an adverse effect on the environment and which will be banned from use in the near future. As a result, alternative soldering procedures have been sought in which high quality solder joints are produced without the use of flux.

One approach to fluxless soldering involves maintaining an atmosphere surrounding the components to be soldered which is conducive to solder bond formation. For example, U.S. Pat. No. 4,646,958 discloses a fluxless soldering process where the soldering components are maintained in an atmosphere comprising from about 0.1 to about 10 percent by volume silane gas. U.S. Pat. No. 4,937,006 discloses another fluxless soldering process where a hot reducing or non-reactive gas is directed at the solder mound. The heated gas has a momentum which is sufficient to disperse the contaminating oxide layer on the surface of the molten solder.

Another approach to providing a fluxless solder procedure involves adding different components to the solder in order to provide a composition with no char-forming constituents such as rosins. For example, U.S. Pat. No. 4,728,023 discloses a fluxless solder composition which is made up of finely divided solder metal and a fluorinated tertiary alkylamine which acts as a vehicle for the solder. During the soldering process, the surfaces to be soldered are placed in a chamber which contains boiling vapors of a second liquid fluorinated tertiary alkylamine having a lower boiling point than the fluorinated tertiary alkylamine in the solder composition. As a result, the fluorinated tertiary alkylamine in the solder dissolves in the lower boiling point fluorinated tertiary alkylamine and is removed during the process.

The above-described processes are exemplary of attempts to provide soldering processes which are not dependent upon fluxes which leave an undesirable residue. It would be desirable to provide an improved fluxless soldering process which does not require reactive gases. Further, it would be desirable to provide a fluxless soldering composition which includes additives that remove contaminating oxides during the soldering process without leaving a residue which must be cleaned or otherwise recovered during the soldering process.

SUMMARY OF THE INVENTION

In accordance with the present invention, an improved fluxless solder is provided which can be used in inert atmospheres for soldering without flux. The present invention is based upon the discovery that the addition of certain limited amounts of a reducing agent to the solder composition effectively removes metal oxide contaminants to enhance wetting by the solder. The reducing agents in accordance with the present invention are converted to compounds which will not require subsequent cleaning.

In accordance with the present invention, a fluxless solder composition is disclosed wherein a solder alloy comprising tin and lead is alloyed with a reducing agent such as lithium, calcium, strontium or cesium. It was discovered that such reducing agents can be introduced into the base solder material up to levels of about 10 atom percent. The reducing agent preferentially reacts with interfering oxides, that is oxides present on the surface to be soldered and oxides in the solder, which would otherwise interfere with routine soldering.

As a feature of the present invention, the resulting oxide which forms between the reducing agent and interfering oxides is essentially inert and will require no further cleaning. It was discovered, in accordance with the present invention, that up to 10 atom percent of the reducing agent can be added to the lead-tin solder to provide maximum deoxidizing capabilities The above-discussed features and advantages of the present invention will become better understood by reference to the following detailed description.

DESCRIPTION OF THE PREFERRED EMBODIMENTS

The present invention is a fluxless solder composition which may be used in conventional soldering procedures. The invention is based upon the discovery that reducing agents, such as lithium, calcium, strontium and cesium, may be added to lead-tin solders to provide an effective means for removing interfering oxides during the soldering process. The reducing agent present in the solder reacts with contaminant metal oxides to produce both a surface that is suitable for being wetted by solder and an oxide-free solder that readily wets the surface to be soldered.

The use of the above reducing agents in a wide variety of solder compositions is possible provided that the heat of formation of the reducing agent is much larger than the heat of formation of the soldering composition. The present invention is particularly well-suited for lead-tin solder compositions which are conventionally used in a wide variety of soldering operations. A particularly preferred solder composition is a standard composition containing 63 weight percent tin and 37 weight percent lead. This particular composition is widely used in a variety of soldering applications. Other solder compositions which may be used include those containing 60 weight percent tin and 40 weight percent lead, or 50 weight percent tin and 50 weight percent tin, or 95 weight percent tin and 5 weight percent antimony.

The fluxless solder in accordance with one embodiment of the present invention is prepared by mixing the reducing agent with molten solder, whereby the reducing agent dissolves in the molten solder to form an alloy. For the purposes of this detailed description, the described reducing agent will be lithium while the tin-lead solder will be the 63 weight percent tin and 37 weight percent lead alloy mentioned above. Although the following description will be limited to compositions containing lithium and a particular lead-tin alloy solder, it will be understood by those skilled in the art that other solder compositions and other reducing agents are within the scope of the present invention.

The lithium and molten solder are mixed together in an oxygen-free argon atmosphere. The amount of lithium mixed with the tin-lead solder should be between about 0.5 atom percent to 10 atom percent. Preferably, the amount of lithium present in the fluxless solder will be between about 3 to 5 atom percent. This amount of lithium was found to provide the optimum enhancement in solderability of oxide contaminated surfaces while still providing a good solder bond.

After the appropriate amount of lithium has been mixed with molten tin-lead solder, the composition may be cooled to form fluxless solder ingots, beads, wire or other configurations. The resulting solid fluxless solder should be stored in an oxygen-free, dry atmosphere to prevent oxidative contamination. The fluxless solder may then be used in accordance with conventional soldering procedures to provide high quality solder joints without the use of flux. As in any high quality solder process, the environment at the solder joint should be controlled to eliminate contaminants and interfering reactants, as is well known in the art. The fluxless solder in accordance with the present invention is heated during soldering to a temperature above the melting point of the solder, usually above 250° C., and preferably above 300° C. The upper limit to which the solder of the present invention may be heated depends on its use, and temperatures just below brazing temperatures (i.e. about 450° C.) may be used.

In accordance with a second embodiment of the present invention, the fluxless solder may be formed by providing a heterogeneous composite comprising a mixture of powdered lithium and a powder of the solder, which are compressed and then formed into an easily used shape, such as a sheet or other free-standing structure. The structured composite is applied to the surface to be soldered and heated to about 300° C. or higher to form the fluxless solder of the present invention in the molten state. The conditions for handling these components during preparation of this composite are the same as those indicated above for the first embodiment of this invention.

In accordance with a third embodiment of the present invention, the fluxless solder is formed by first infiltrating a pellet of solder with lithium by vapor depositing lithium on the pellet in a vapor deposition chamber. After the pellet has been infiltrated with lithium, a protective coating of tin is provided by vapor depositing tin on the infiltrated pellet. Optionally, the tin coated pellet may be coated with a layer of lead by vapor deposition techniques, to protect the tin from oxidation. The treated pellet is then used as in conventional solder techniques. When the substrate is heated to about 300° C. or higher, the fluxless solder of the present invention is formed. The conditions for handling the lithium and solder during the vapor deposition process are essentially as indicated above for the first embodiment of this invention.

In accordance with a fourth embodiment of the present invention, the lithium is first provided in the form of particles surrounded by a protective coating, such as lead, which protects the lithium from oxidation during handling and storage. These lead-coated lithium particles may be formed, for example, by milling the lead and lithium together to coat the lithium particles. The lead-coated lithium particles are mixed with the solder and applied to the surface to be soldered. When the solder is heated to about 300° C. or higher, both the lead-coated lithium particles and the solder fuse, to form the fluxless solder of the present invention. The conditions for handling the lithium and the solder are substantially the same as those described above for the first embodiment of this invention.

Examples of practice of the present invention are as follows.

EXAMPLE 1

This example illustrates the preparation of the fluxless solder of the present invention in accordance with the first embodiment, in which lithium was mixed with molten solder. This example also presents solderability test data for the fluxless solder of the present invention.

A number of fluxless solders in accordance with the present invention containing from 0.5 atom percent up to 30 atom percent lithium were prepared. The fluxless solders were prepared by adding differing amounts of lithium metal to molten solder containing 63 weight percent tin and 37 weight percent lead, which was obtained from Kester Solder of Chicago, Ill. The mixing and formation of the fluxless solders in the molten state were conducted in a dry, oxygen-free argon atmosphere.

The various solder-lithium alloys were qualitatively tested by placing them on cleaned copper surfaces and gold-plated copper surfaces which were maintained at temperatures of between 315° C. and 350° C. and under argon atmospheres. Solder with no flux did not wet the copper surface but did partially wet the gold surface. However, solder with 0.5 to 5 atom percent lithium wet both the copper and gold surfaces. The fluxless solder containing 3 to 5 atom percent lithium under an argon atmosphere, wetted both surfaces more easily than the solders having less or more lithium.

When fluxless solders containing above 5 atom percent lithium were tested, the surfaces were adequately wetted, but there was increasing incidences of difficulty in wetting. In addition, increasing amounts of lithium above about 10 atom percent increased the melting point of the solder. When the lithium content of the solder was increased to 30 atom percent, the solder did not melt below 350° C. and was undesirably brittle at room temperature.

The copper and gold metal surfaces were sectioned after soldering to observe the solder-copper and solder-gold interfaces. The interfaces for those fluxless solders containing 0.5 to 10 atom percent were void-free and exhibited good wetting.

Fluxless solders in accordance with the present invention containing either 5 or 8 atom percent lithium were tested for their ability to wet clean copper surfaces under argon, helium, nitrogen and vacuum atmospheres. In all cases, the fluxless solder wet the copper surface. Qualitatively, it appeared that the 8 atom percent lithium fluxless solder seemed to wet the surface better than the 5 atom percent lithium fluxless solder under vacuum conditions. While the fluxless solders in accordance with the present invention were tested under argon, helium, nitrogen and vacuum atmospheres, it is not intended to so limit the present invention. The solders of the present invention may be effectively used with other soldering techniques which are well known in the art, such as vapor phase soldering, laser soldering, electron beam soldering, resistance soldering, infrared soldering, or soldering under other inert gases.

Solderability testing of wires was conducted with a Multi-Core Solderability Testing Machine obtained from Multi-Core in England. In order to achieve a variety of oxidative conditions, several samples were cleaned in a solution of 10 percent fluoroboric acid and several samples were baked for one hour at 230° C. following cleaning. The fluoroboric acid cleaned samples were considered as being contaminant-free while the baked sample were considered to be highly oxidized. The two types of copper wire, i.e. cleaned and oxidized, were then subjected to a solderability test program. The solderability test program consisted of treating the wires with rosin flux (Type R) or activated rosin (Type RMA) and subsequently dipping these wires in standard solder containing 63 weight percent tin and 37 weight percent lead. In addition, cleaned wires and oxidized wires were also dipped in lithium doped solder in accordance with the present invention wherein the lithium concentration ranged from 1 to 8 atom percent. Also, untreated copper wire was dipped into standard solder. All soldering was conducted in an argon-purged glovebox. Evaluation of the solderability of these samples was based on their wetting force. The more solderable the copper wire sample, the greater its wetting force. A summary of the test results is set forth in Table I.

As shown in Table I, the copper wire samples that were cleaned and then immersed in flux exhibited the greatest wetting force. The copper wire samples that were not immersed in flux and in which the solder contained no lithium exhibited the least solderability and solder wetting force. However, examination of copper wire samples that were tested with the lithium doped solder reveals that although the wetting was not as good as for the fluxed samples, the wetting was greater than those samples not having prior flux treatment. The test results show the trend of increasing wetability with increasing concentration of lithium in the range of 1 to 3 atom percent.

As is apparent from the above-detailed description, the fluxless solders in accordance with the present invention are useful in improving the wetability of solder to surfaces such as copper. The fluxless solder is especially useful in situations where it is desirable to solder surfaces without the need to use a flux.

TABLE I

| Lithium (atom %) | Flux | Measurement of Wetting Force | |
|---|---|---|---|
| | | Force for cleaned Copper (Cu) Wire (mN/mm) | Force for Oxidized Copper (Cu) (mN/mm) |
| 0 | R | +2.42 | −5.38 |
| 0 | RMA | +2.61 | −4.17 |
| 0 | none | −3.27 | −3.86 |
| 1 | none | −2.76 | −2.16 |

TABLE I-continued

| Lithium (atom %) | Flux | Measurement of Wetting Force | |
|---|---|---|---|
| | | Force for cleaned Copper (Cu) Wire (mN/mm) | Force for Oxidized Copper (Cu) (mN/mm) |
| 2 | none | −0.65 | −1.36 |
| 3 | none | −1.06 | −0.90 |
| 4 | none | −2.29 | −2.23 |
| 5 | none | −2.72 | −1.05 |
| 6 | none | −1.55 | −1.49 |
| 7 | none | −1.00 | −0.95 |
| 8 | none | −1.81 | −1.43 | mN/mm = millinewton per millimeter

EXAMPLE 2

This example illustrates the preparation of the fluxless solder of the present invention in accordance with the second embodiment, in which powdered lithium was mixed with powdered solder.

In an argon atmosphere glove box, 0.025 g of lithium powder, obtained from Alfa Company of Danvers, Mass., was mixed with 10 g of 63/37 solder powder, i.e. comprising 63 weight percent tin and 37 weight percent lead, which was 99.9 percent pure and was obtained from Advanced Metals Technology of Branford, Conn. The powders were mixed with a mortar and pestle for about 3 minutes and the mixture was then placed in a steel compression pellet mold. A small vise was used to apply pressure for about one hour. The pellet was removed from the die, taken out of the glove box, and formed into a sheet having a thickness of 15 mil (0.003 centimeter) by placing the pellet between two metal sheets and applying pressure. This sheet of solder alloy was used for solderability testing under vacuum, argon, and helium atmospheres, as described in Example 1. The specimens soldered using this sheet configuration of the fluxless solder of the present invention were examined by cross-section analysis and it was determined that the present solder exhibited good wetting on copper samples which has been precleaned with a 5 percent fluoroboric acid solution.

EXAMPLE 3

This example illustrates the preparation of the fluxless solder of the present invention in accordance with the third embodiment, in which lithium was infiltrated into a solder pellet by vapor deposition and the pellet was then provided with a protective tin coating by vapor deposition.

Using a Mark VII CV DOT Test Deposition System, obtained from Cooke Vacuum Corporation, one tungsten evaporation boat was loaded with 2 g of lithium and the other evaporation boat was loaded with 2 g of tin. A porous pellet of 10 g of 63/37 tin/lead solder, obtained from Advanced Metals Technology, was placed into the deposition system. The system was closed and a vacuum of $10^{-6}$ torr was pulled. The current for the lithium deposition boat was turned to 70 amps at 60 volts, for one hour at a vacuum of $10^{-5}$ torr. After the porous pellet had been infiltrated with lithium, a protective coating of tin was applied by heating the tin deposition boat by applying a current of 100 amps at 50 volts for 35 minutes at a vacuum of $8 \times 10^{-5}$ torr.

The infiltrated and protected pellet was cut into sections and tested for solder wetability as described in Example 1. Copper plates were precleaned in a 5 percent fluoroboric acid solution, washed, and oven dried. In a vacuum oven at $10^{-6}$ torr vacuum, a copper plate was heated with the section of the pellet. At 321° C., the pellet fused and wetted the copper surface. Under a nitrogen atmosphere, the pellet melted at 321° C. and wetted the copper surface.

Having thus described exemplary embodiments of the present invention, it would be noted by those skilled in the art that the disclosures within are exemplary only and that various other alternatives, adaptations and modifications may be made within the scope of the present invention. Accordingly, the present invention is not limited to the specific embodiments as illustrated herein, but is only limited by the following claims.

What is claimed is:

1. A fluxless solder for application to a metal surface wherein said surface includes metal oxides located thereon, said fluxless solder comprising:
   a solder alloy comprising tin and lead wherein said solder contains oxides of said tin and of said lead;
   a sufficient amount of a reducing agent to react with said metal oxides and said oxides of tin and lead when said solder is applied to said metal surface and heated to a temperature above the melting point of the solder.

2. A fluxless solder according to claim 1 wherein said reducing agent is selected from the group consisting of lithium, calcium, strontium and cesium.

3. A fluxless solder according to claim 2 wherein said reducing agent is lithium.

4. A fluxless solder according to claim 3 wherein said solder alloy comprises approximately 63 weight percent tin and 37 weight percent lead.

5. A fluxless solder according to claim 3 wherein said lithium is present in said fluxless solder in an amount of between about 0.5 to 10 atom percent.

6. A fluxless solder according to claim 5 wherein the amount of lithium present in said fluxless solder is between about 3 to 5 atom percent.

7. A fluxless solder according to claim 4 wherein said lithium is present in said fluxless solder in an amount of between about 0.5 to 10 atom percent.

8. A fluxless solder according to claim 4 wherein the amount of lithium present in said fluxless solder is between about 3 to 5 atom percent.

* * * * *